United States Patent [19]

Campbell

[11] 4,358,154
[45] Nov. 9, 1982

[54] VEHICLE CRASHWORTHY SEAT

[75] Inventor: Richard F. Campbell, Broomall, Pa.

[73] Assignee: Boeing Vertol Company

[21] Appl. No.: 213,709

[22] Filed: Dec. 5, 1980

[51] Int. Cl.$^3$ ............................................. B60R 21/10
[52] U.S. Cl. ..................................... 297/216; 188/372
[58] Field of Search ....................... 297/216, 471, 472; 188/371, 374, 372

[56] References Cited

U.S. PATENT DOCUMENTS

| | | |
|---|---|---|
| 1,511,264 | 10/1924 | Carter . |
| 2,979,163 | 4/1961 | Van Zelm ............................ 188/372 |
| 3,059,966 | 10/1962 | Spielman ............................. 297/216 |
| 3,087,584 | 4/1963 | Jackson ................................ 188/372 |
| 3,603,638 | 9/1971 | McGregor .......................... 297/216 |
| 3,697,128 | 10/1972 | Strien et al. ......................... 297/216 |
| 3,730,586 | 5/1973 | Eggert ................................. 297/216 |
| 3,832,002 | 8/1974 | Eggert ................................. 297/216 |
| 3,868,143 | 4/1973 | Reilly ................................... 297/216 |
| 3,968,863 | 7/1976 | Reilly ................................... 188/372 |
| 4,003,534 | 1/1977 | Kenigsberg ......................... 297/216 |
| 4,005,765 | 2/1977 | Reilly ................................... 188/372 |
| 4,150,805 | 10/1976 | Mazelsky ............................ 244/122 |

OTHER PUBLICATIONS

Mason J. Reilly, "Crashworthy Troop Seat Investigation", Dec. 1974, pp. 53-56.

Primary Examiner—Francis K. Zugel
Attorney, Agent, or Firm—Jones, Tullar & Cooper

[57] ABSTRACT

A crashworthy helicopter crew seat, which includes a seat bucket connected to a support structure by an adjustable energy attenuator of the wire bending type. The attenuator includes a frame carried by the seat bucket, three parallel, vertically disposed wires connected at opposite ends to the attenuator frame, and a trolley assembly affixed to the support structure containing three sets of three rollers, rotatable about three vertically spaced horizontal axes, about which the three wires are respectfully bent and unbent as the seat bucket strokes downward during a crash of the helicopter. The lower two rollers of two of these sets of three rollers are displaceable along their axes between an engaged position and a disengaged position relative to a wire associated with these rollers. These displaceable rollers are connected to a manually operated attenuator adjustment mechanism having a maximum setting at which all rollers are engaged with their associated wires, an intermediate setting at which only two of the three sets of three rollers are engaged with their associated wires, and a minimum setting at which only one wire is engaged with the set of three rollers which is not connected to the adjustment mechanism. By selecting a maximum, intermediate, and minimum settings of the adjustment mechanism in accordance with the weight of the seat occupant, the maximum stroke distance of the seat is reduced without detrimentally affecting the protection afforded the occupant of the seat against dangerous acceleration forces.

12 Claims, 10 Drawing Figures

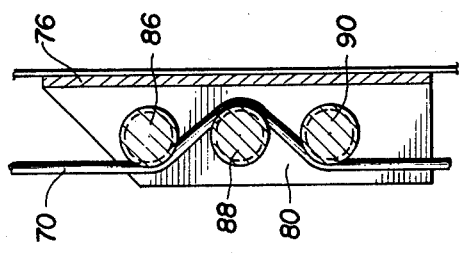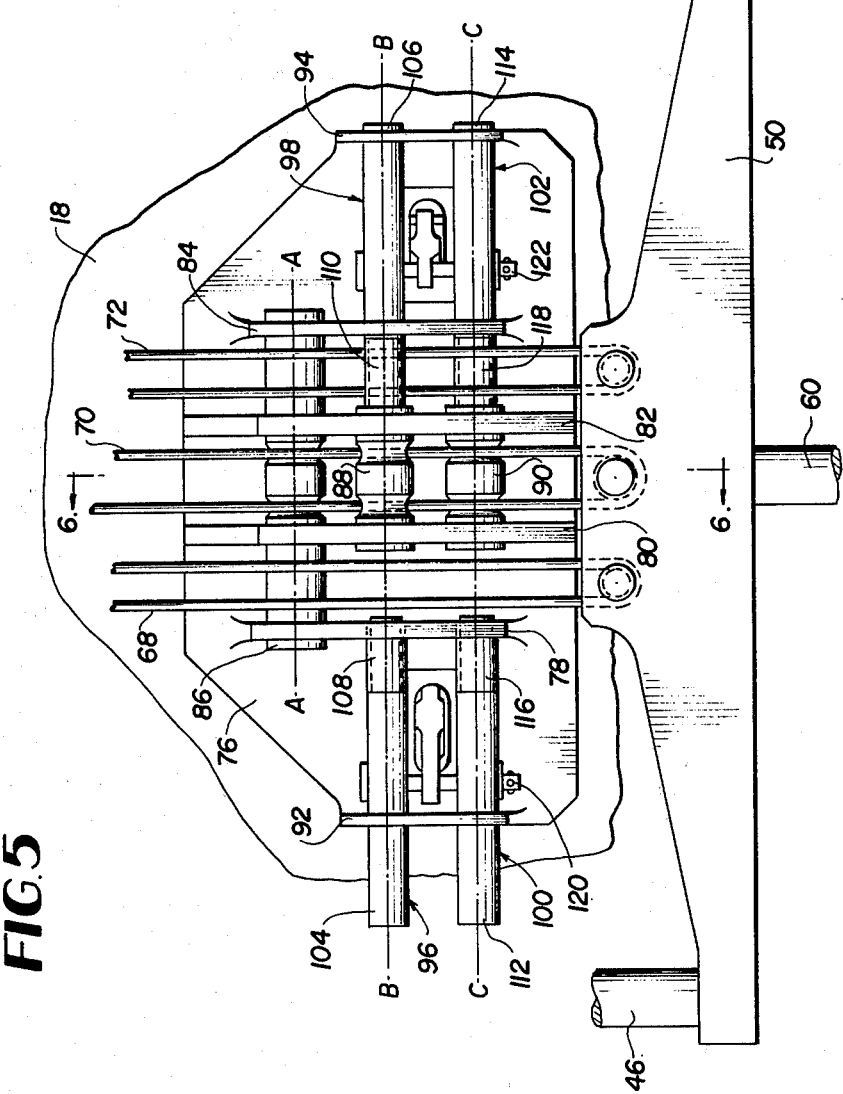

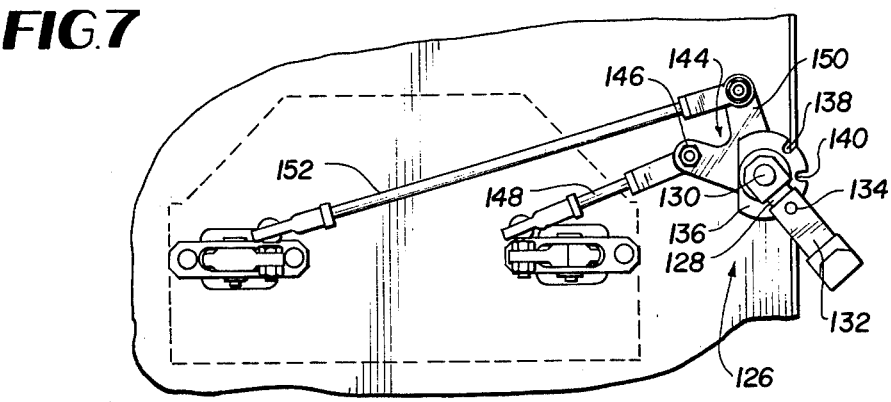
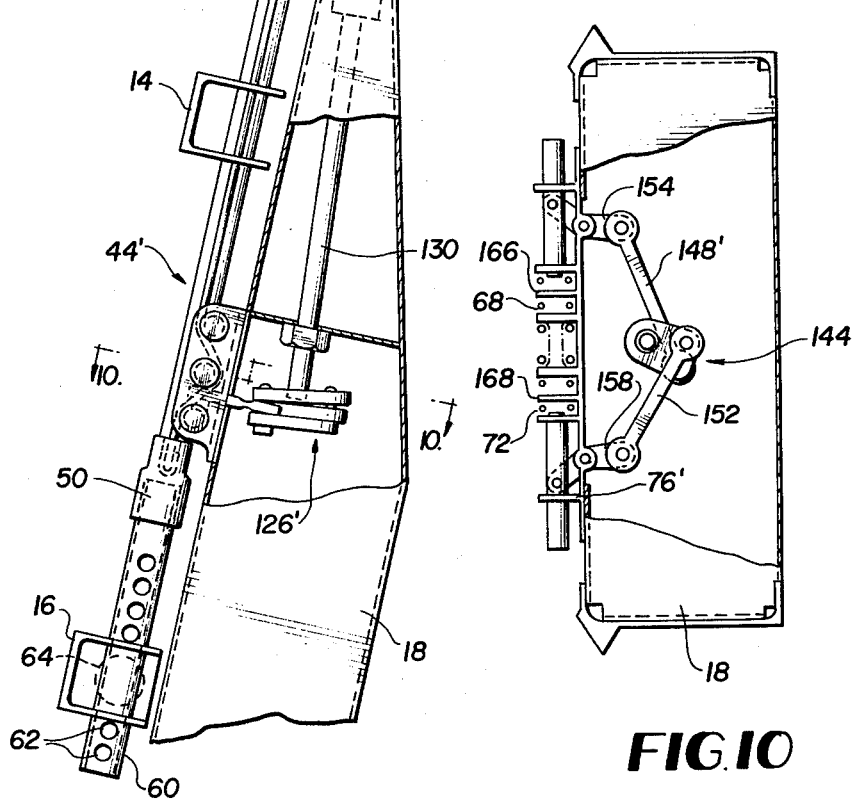

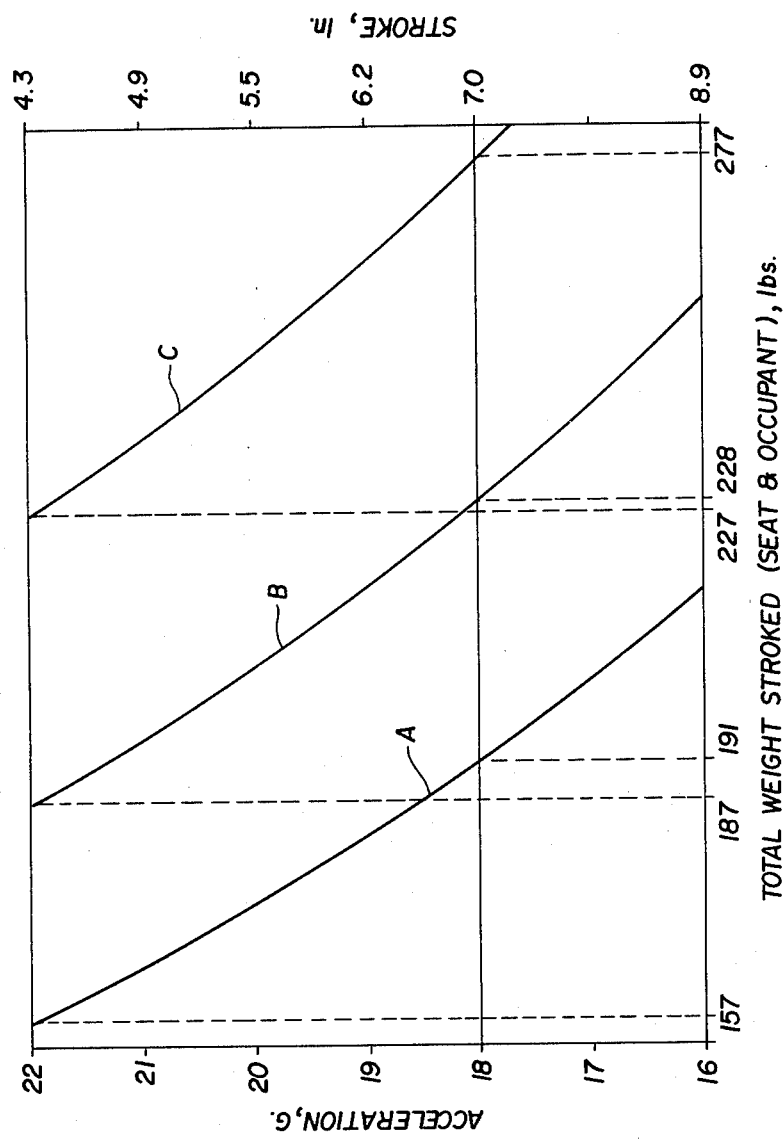

VEHICLE CRASHWORTHY SEAT

BACKGROUND OF THE INVENTION

The invention relates generally to crashworthy seats for a moving vehicle, in particular, to energy attenuating crew seats for a helicopter.

It is known to use an energy attenuation system to connect a helicopter crew seat to a supporting structure. The energy attenuating system may include vertically extending wires, affixed at opposite ends to the support structure and passing through a three-roller trolley attached to the seat. The wire is sized so that it will bend and unbend over the rollers, and allow the seat to move downward, or stroke, when a specified force acts upon the seat in a downward direction. This specified force is selected to be less than an inertia force acting upon the occupant of the seat during a crash of the helicopter which is likely to cause fatal damage to the occupant. When a crash occurs, a seat will start to stroke downward when the inertia force acting upon it in the downward direction increases to the specified force. As the seat strokes downward, energy is absorbed by the bending and unbending of the wires over the rollers of the trolley, and inertia force acting upon the seat occupant is maintained at a constant level, even through the surrounding structure may experience inertia forces of much higher levels.

The inertia force applied to the seats which is necessary to cause stroking during a crash of the helicopter is determined by multiplying the weight of the occupant and seat by the acceleration or G level. Thus, since the specified force required to initiate stroking of the seat is a constant of the energy attenuation system, it is seen that a light-weight seat occupant will experience a higher G level than a heavy-weight seat occupant. Also, for the same crash conditions, the seat will stroke a greater distance when occupied by a heavy-weight occupant than it will when occupied by a light-weight occupant. Thus, the specified force required to initiate stroking of the seat must be selected on the basis of the weight of the lightest occupant expected to use the seat, and the seat stroke distance must be selected on the basis of the weight of the heaviest occupant to use the seat.

As a result of having to use the weight of the lightest occupant to select the force necessary to initiate stroking of the seat, the G level experienced by a heavy seat occupant will be much lower than that required to protect him against fatal damage, and a seat will stroke through a much greater distance than would otherwise be required. For example, in a known crashworthy crew seat for a military helicopter, when the seat is occupied by a light-weight occupant wearing only tropical clothing, the seat will begin to stroke when the acceleration rises to approximately 22 G, and will stroke for approximately 4 and ½ inches, under specified crash conditions. Under the same specified crash conditions, when the seat is occupied by a heavy occupant wearing survival gear, body armour, and arctic clothing, so that a total weight of the heavier occupant is 100 pounds greater than the above-mentioned lighter occupant, the seat will begin to stroke when the acceleration reaches approximately 14.3 G, and the seat will stroke approximately 11.2 inches.

In the past, the energy attenuator systems for crashworthy crew seats in a helicopter have been set to initiate stroking of the seat at one specific inertia force level to protect the lightest expected occupant; consequently, these known seats must be designed to provide a minimum of 12 inches of clearance space between the lower surface of the seat pan when adjusted to its lowest position and the basic aircraft floor structure to provide the minimum stroking distance required when the seat is occupied by the heaviest expected occupant. This requirement imposes severe restrictions to the structural designs of new aircraft, and, in many cases, prohibits the successful retrofit of a crashworthy seat in an existing aircraft.

OBJECTS AND SUMMARY OF THE INVENTION

Therefore, it a primary object of the invention to provide a crashworthy seat for a vehicle wherein the seat is connected to a support structure of the vehicle by an adjustable energy attenuator which can be adjusted in accordance to the weight of the seat occupant.

It is a related object of the invention to provide a crashworthy crew seat for a helicopter, wherein the adjustable energy attenuator can be adjusted so that the maximum stroke of the seat during a crash of the helicopter is much less than the maximum stroke of an equivalent crashworthy seat having a non-adjustable energy attenuator.

A crashworthy helicopter crew seat, according to the invention, includes a seat bucket which is slideably connected to a vertically extending support structure, which is in turn, slideably attached to the aircraft frame in the same manner as known helicopter crew seats. The back of the seat bucket is connected to the vertical support frame through an adjustable energy attenuator which can be adjusted in predetermined steps by an adjustment mechanism mounted to the support structure.

The adjustable energy attenuator includes a wire support frame to which the seat bucket is slideably mounted and locked thereto by a locking pin, so that the seat can be adjusted vertically with respect wire mounting frame. At least three sets of parallel arranged wires extend between top and bottom members of the wire support frame through a trolley carried by the seat support member. The trolley includes three wire bending assemblies, one for each set of wires. Each wire bending assembly includes three vertically spaced, horizontally extending parallel rod members. When the variable energy attenuator is fully engaged, the three sets of wires are bent about one side of the top rod members, the opposite side of the intermediate rod members, and about the same one side of the bottom rod members, so that during stroking of the seat, all of the wires bend and unbend as the seat bucket strokes downward. The axes of all of the rod members are fixed relative to the trolley structure to which they are connected. The three top rod members may be pivotally carried by the trolley structure for rotation about their axes, and, may be connected together as a single common rod. The middle and bottom rod members of the first wire bending assembly may also be pivotally connected to the trolley structure for rotation about their axes. The middle and bottom rod members of a second wire bending assembly disposed on one side of the first wire bending assembly are slideably carried by the trolley structure for axial movement between a first position in which these rollers engage a second set of the wires and a second position at which these rod members are disengaged from the second set of wires. The middle and bottom rod members of this second wire bending assembly are connected with each other and to attenuator adjustment mechanism. The middle and bottom rod members of the third wire bending assembly, which is disposed on the opposite side of the first wire bending assembly, are also carried by the trolley structure for axial movement along their axes between the first position at which they are engaged with the third set of wires, and a second position at which they are disengaged from the third set of wires. The middle and bottom rod members of this third wire bending assembly are also connected with each other and with the energy attenuator adjustment mechanism.

The first wire bending assembly of the trolley is always engaged with the first set of wires, and thus determines the minimum engagement setting of the energy attenuator, at which the middle and bottom rod members of the second and third wire bending assemblies are disposed in their disengaged positions. When the attenuator adjustment mechanism is moved from its lowest setting to an intermediate setting, the middle and bottom rod members of the second wire bending assembly are moved along their axes to their engaged positions, so that the first and second sets of wires are engaged with the first and second wire bending assemblies, respectfully. When the attenuator adjusting mechanism is moved to its fully engaged position, the middle and bottom rod members of the third wire bending assembly are moved axially into their first position to engage the third set of wires.

The invention will be better understood and further objects and advantages will become more apparent from the ensuing detailed description of a preferred embodiment, taken in conjunction with the drawings.

BRIEF DESCRIPTION OF THE DRAWINGS

FIG. 5 is an enlarged view of the energy attenuator trolley shown in FIG. 2;

FIG. 6 is a vertical cross-sectional view of the trolley assembly shown in FIG. 5, taken along the line 6—6 of FIG. 5;

FIG. 7 is a back vertical view of the energy attenuator adjustment mechanism, shown in FIG. 4; taken along the line 7—7 of FIG. 4;

FIG. 8 shows performance curves of acceleration and stroke distance versus the weight of the seat and seat occupant for maximum, intermediate, and minimum settings of the adjustable energy attenuator of the helicopter crew seat;

FIG. 9 is a partial side view of another embodiment of the invention; and

FIG. 10 is a top view of the embodiment of FIG. 9, with portions of the support structure removed to better view other elements therein.

DESCRIPTION OF THE PREFERRED EMBODIMENT

Figure 1:
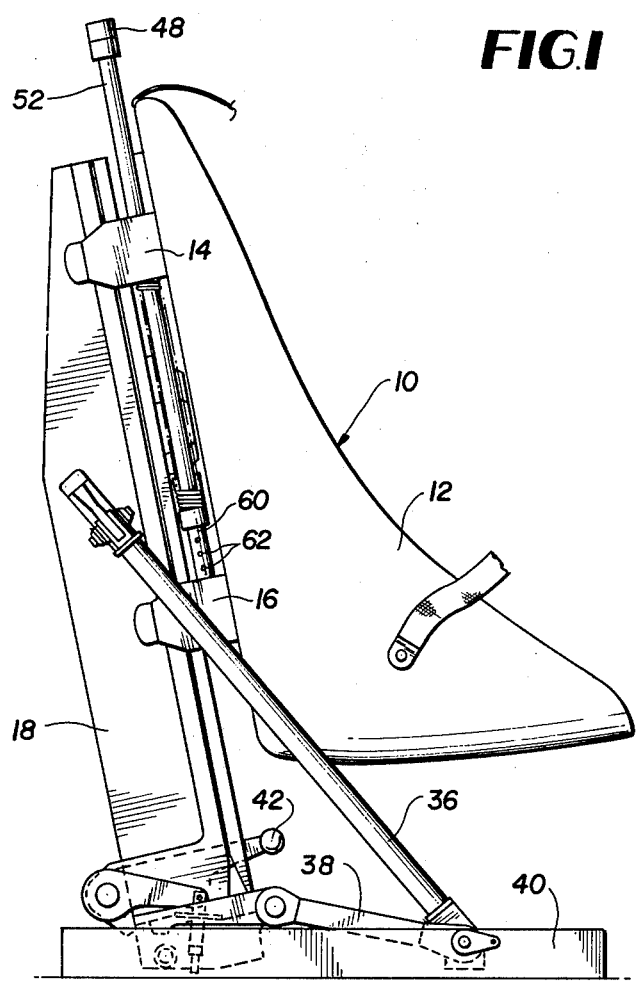
FIG. 1 is a side view of a crashworthy crew seat for a helicopter, according to the invention.
Figure 3:
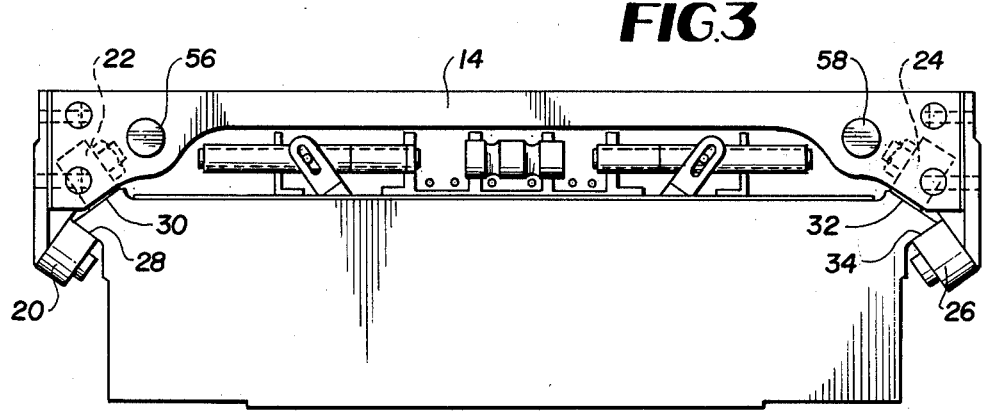
FIG. 3 is a cross-sectional view of the seat structure shown in FIG. 2, taken along the line 3—3 of FIG. 2.
Figure 4:
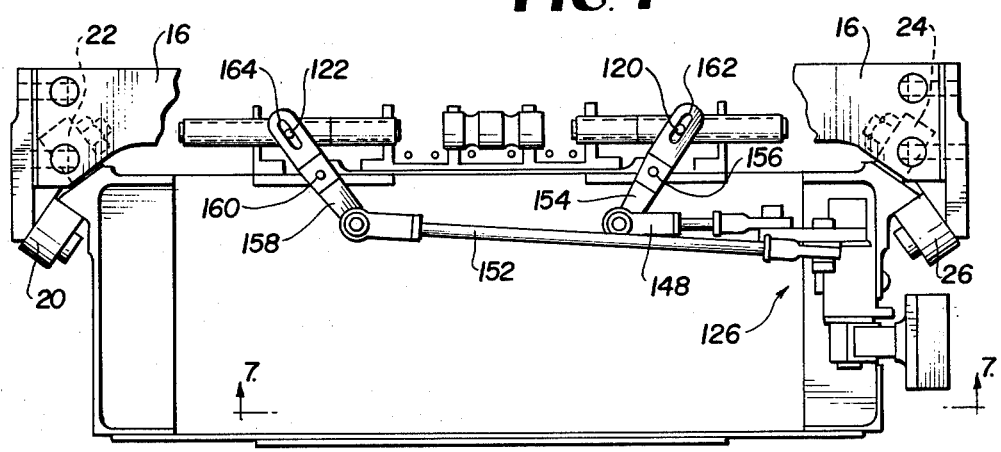
FIG. 4 is an other cross-sectional view of the seat structure shown in FIG. 2, taken generally along the line 4—4 of FIG. 2.

The crashworthy helicopter crew seat assembly 10 shown in FIG. 1 includes a seat bucket 12 having a back portion affixed to two support brackets 14 and 16. The seat bucket 12 is held in rolling contact with a support structure 18 by a set of four rollers 20, 22, 24, 26, carried by each of the support brackets 14, 16, which are engaged in rolling contact with four vertically extending track surfaces 28, 30, 32, 34, of the support structure 18, respectively, as seen in FIGS. 3 and 4. The support structure 18 includes a diagonal member 36 which is connected to a generally horizontal member 38 and is held in rolling contact with a horizontal track member 40 affixed to the floor of the aircraft, to allow horizontal movement of the seat bucket 12 along the track member 40. The support structure 18 also includes a locking mechanism 42 for securing the support structure 18 to the floor of the aircraft at selected intervals along the horizontal track 40.

Figure 2:
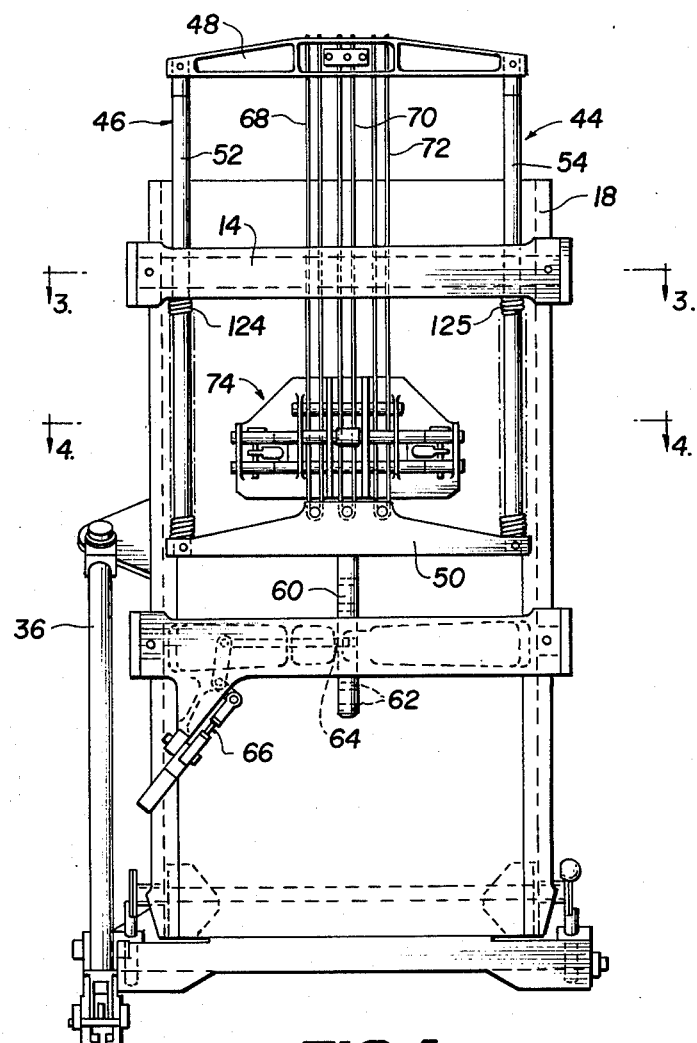
FIG. 2 is a vertical view of the crew seat shown in FIG. 1, with the bucket seat removed from its back support frame members.

A seen in FIG. 2, an energy attenuating assembly 44 is connected between the seat support brackets 14, 16 and the support structure 18, to prevent movement of the seat bucket 12 with respect to the support structure 18 during normal operation of the aircraft. An energy attenuator support frame 46 includes top and bottom wire support members 48, 50, which are connected at each end to two side support rods 52, 54, which extend through openings 56, 58 in the upper support bracket 14 of the seat bucket 12. A vertically extending rod 60, having a series of vertically-spaced, diametrical holes 62 drilled therethrough, is affixed at its upper end to a center portion of the bottom wire support member 50. The rod 50 is telescopically received by, and extends through, a center opening in the lower support bracket 16 of the seat bucket 12. A spring actuated lock pin 64, which is slidably supported within the lower support bracket 16 and is connected to a seat height adjustment mechanism 66, extends into a selected one of the diametrical holes 62 to lock the seat bucket 12 to the energy attenuator support frame 46. Three attenuation wires 68, 70, 72, have mid-points which are affixed to the bottom wire support member 50, and parallel-disposed opposite end portions which extend through a roller trolley assembly 74 to the top wire support member 48, to which the ends of the three wires 68, 70, 72 are affixed.

The trolley assembly 74, best seen in FIGS. 4 and 5, includes a mounting plate 76 which is affixed to the support structure 18 and which includes four vertical plates 78, 80, 82, 84 extending into the support frame 46 on either side, and in between, the three wires 68, 70, 72. Each of the vertical plates 78, 80, 82, 84, have three circular openings therethrough for supporting rollers or rods disposed or inserted therein along three, vertically spaced, horizontal axes A—A, B—B, C—C. A top roller member 86 extends through the top openings of the vertical plates 78, 80, 82, 84 and is rotatably mounted therein for rotation about the axis A—A. An intermediate roller member 88 extends through the intermediate holes of the vertical plates 80, 82, and is rotatably mounted therein for rotation about the axis B—B. A bottom roller member 90 extends through the bottom holes of the plates 80, 82, and is rotatably mounted therein for rotation about the axis C—C.

As shown in FIG. 6, both end portions of the attenuator wire 70 extending from the top wire support member 48, are bent in a counter-clockwise direction about the front side of the top roller member 86, then are bent in a clockwise direction about the back side of the intermediate roller member 88, and next are bent again in a clockwise direction about the front side of the bottom roller member 90, as this wire 70 passes through the trolley assembly 74.

Referring again to FIG. 5, the mounting plate 76 includes two vertically disposed end plates 92, 94, each containing two openings aligned with the intermediate and bottom openings through the plates 78, 80, 82, 84, respectively. A first intermediate rod assembly 96 extends through the intermediate openings of the vertical plates 92, 78, and is slideably mounted therein for translation along the axis B—B between a disengaged position, shown in FIG. 4, and an engaged position, shown in FIG. 2. Similarly, a second intermediate rod assembly 98 extends through the intermediate openings of the vertical plates 84, 94, and are slideably mounted therein for translation along the axis B—B.

A first bottom rod assembly 100 extends through the bottom openings of the vertical plates 92, 78, and are slideably mounted therein for translation along the axis C—C between an engaged position and a disengaged position. Similarly, a second bottom rod assembly 102 extends through the bottom openings of the vertical plates 84, 94, and is slideably mounted therein for translation along the axis C—C.

The first and second intermediate rod assemblies 96, 98 include first and second intermediate rod members 104, 106 and first and second intermediate rollers 108, 110, which are rotatably mounted about the inner ends of the rod members 104, 106, respectfully, for rotation about the axis B—B. Similarly, the first and second bottom rod assemblies 100, 102, include first and second bottom rod members 112, 114, and first and second bottom rollers 116, 118, which are rotatably mounted to the inner ends of the first and second bottom rod members 112, 114, respectively, for rotation about the axis C—C.

The first intermediate and bottom rod assemblies 96, 100, are connected together for tandem operation by a first connecting pin 120 extending diametrically through the first intermediate and bottom members 104, 112. The second intermediate and bottom rod assemblies 98, 102, are connected together for tandem operation by a second connecting pin 122 which extends diametrically through the second intermediate and bottom members 106, 114. When the first intermediate and bottom rod assemblies 96, 100, are disposed in their engaged positions, both end portions of the attenuating wire 68 are bent about the top roller member 86, the first intermediate roller 108, and the first bottom roller 116, in the same manner as both end portions of the wire 70 are bent about the roller members 86, 88, and 90, as shown in FIG. 6. Similarly, when the second intermediate and bottom rod assemblies 98, 102, are disposed in their engaged positions, shown in FIG. 5, both end portions of the wire 72 are bent about the top roller member 86, the second intermediate roller 110, and the second bottom roller 118, in the same manner as shown for the wire 70 in FIG. 6. The energy attenuator assembly 44 is initially assembled with all four rod assemblies 96, 98, 100, 102, disposed in their engaged positions. Then when these rod assemblies 96, 98, 100, 102, are moved to their disengaged positions, the attenuation wires 68 and 72 will remain as originally bent, so that these rod assemblies 96, 98, 100, 102, will correctly engage the wires 68, 72, when they are returned to their engaged positions.

The two bent portions of the attenuation wire 70, which are always engaged with the roller members 86, 88, 90, prevent movement, with respect to the support structure 18, of the energy attenuator support frame 46 and the seat bucket 12 which is affixed to the frame 46 by the lock pin 64, during normal operation of the aircraft. However, the height of the seat bucket 12 can be adjusted by the seat occupant by withdrawing the lock pin 64, moving the seat bucket 12 to the desired height, then reinserting the lock pin 64 in the closest adjacent hole 62 of the rod 60. The energy attenuator support frame 46 may include two helical springs 124, 125, disposed about the side support rods 52, 54, respectively, which esert a force between the bottom wire support member 50 of the frame 46 and the upper support bracket 14 of the seat bucket 12, to counterbalance the weight of the seat bucket 12 so that it can be easily adjusted to the desired height. These helical springs 124, 126 can also be used to prevent the seat bucket 12 from being lowered beyond the position at which the lock pin 64 engages the lowest one of the holes 62.

An energy attenuator adjustment mechanism 126 for engaging and disengaging the four rod assemblies 96, 98, 100, 102 with the attenuator wires 68, 72, is shown in FIGS. 4 and 7. The adjustment mechanism 126 includes a manual operating lever 128 having one end affixed to an operating shaft 130 which is pivotally carried by the support structure 18 for rotation about the operating shaft axis. A manual operating handle 132, which is slidably carried by the other end of the operating lever 128 for radial movement towards to away from the operating shaft 130, is spring-loaded in the direction of the operating shaft 130 to hold a handle positioning pin 134, affixed to the handle 132, against the periphery of a circular handle positioning plate 136 affixed to the support structure 18 and disposed concentrically about the operating shaft 130. The periphery of the positioning plate 136 defines three indents 138, 140, 142, corresponding to maximum, intermediate, and minimum engaged positions of the energy attenuator assembly 44, respectively. In FIG. 7, the positioning pin 134 is disposed within the indent 142 (not shown) corresponding to the minimum engagement position of the energy attenuator assembly 44.

A bell crank 144, which is affixed to the operating shaft 130, has a first arm 146 pivotally connected to one end of a first connecting link 148, and a second arm 150 pivotally connected to one end of a second connecting link 152. The other end of the first connecting link 148 is pivotally connected to one end of the first lever 154 which is pivotally connected to the support member 18 by a first pivot pin 156 for rotation about an axis substantially orthogonal to the axes A—A, B—B, and C—C. The opposite end of the second connecting link 152 is pivotally connected to one end of a second lever 158 which is pivotally connected to the support structure 18 by a second pivot pin 160 for rotation about an axis substantially orthogonal to the axes A—A, B—B, or C—C. The opposite end of the first lever 154 includes a first elongated opening or slot 162 therethrough, which extends radially of the first pivot pin 156; similarly, the second lever 158 includes a second slot 164 therethrough, which extends radially of the second pivot pin 160. As shown in FIGS. 4 and 5, the first connecting pin 120 connecting the first intermediate and bottom rod assemblies 96, 100, extends through the first slot 162 between the rod assemblies 96, 100; similarly, the second connecting pin 122 connecting the second intermediate and bottom rod assemblies 98, 102, extends through the second slot 164 between the rod assemblies 98, 102.

ATTENUATOR ADJUSTMENT

When the energy attenuator adjustment mechanism 126 is disposed in its minimum engagement position, as shown in FIGS. 4 and 7, only the two portions of the middle wire 70 are engaged with its associated roller members 86, 88, 90. The first arm 146 of the bell crank 144 is disposed near its toggle position on one side thereof, and the second arm 150 of the bell crank 144 is disposed at approximately 90° to the second connecting link 152. Both the first intermediate and bottom rod assemblies 96, 100, and the second intermediate and bottom rod assemblies 98, 102, are disengaged from the two portions of the attenuator wire 68, 72, respectively.

If then the manual operating handle 132 is pulled outward to disengage the handle positioning pin 134 from the lower indent 142 of the handle positioning plate 136, and the operating handle 132 is rotated in a counter-clockwise direction, as seen in FIG. 7, until the handle positioning pin 134 engages the handle positioning plate 136 within the middle indent 140 thereof, the first arm 146 of the bell crank 144 will be rotated counter-clockwise through its toggle point to its intermediate position on the other side of its toggle point. During this rotation of the first crank arm 146, the first intermediate and bottom rod assemblies 96, 100 will move only slightly outward from a fully disengaged position to a maximum disengaged position at its toggle point, then inward to the same fully disengaged position. However, during the counter-clockwise rotation of the second bell crank arm 150 to its intermediate position on the one side of its toggle point, the second intermediate and bottom rod assemblies 98, 102, will be moved from its disengaged position to a fully engaged position at which the two portions of the attenuator wire 72 is engaged with the top roller member 86, the second intermediate roller 110, and the second bottom roller 118.

If then the manual operating handle 132 is again pulled outward to disengage the handle positioning pin 134 from the handle positioning plate indent 140, and the manual operating handle 132 is rotated counter-clockwise again until the handle positioning pin 134 engages with the positioning plate upper indent 138, the first bell crank arm 146 will be rotated counter-clockwise to move the first intermediate and bottom rod assemblies 96, 100 to their fully engaged positions at which the attenuator wire 68 engages the top roller member 86, a second intermediate roller 108, and the second bottom roller 116. However, the further counter-clockwise movement of the second bell crank arm 150 from its intermediate position to its fully engaged position merely rotates the second bell crank arm 150 over its toggle point, during which the second intermediate and bottom rod assemblies 98, 102, remain fully engaged with the attenuator wire 72. Since the second intermediate and bottom rod assemblies 98, 102, do move slightly inwardly to a maximum position at the toggle point of the bell crank second arm 150, the ends of the intermediate and bottom roller members 88, 90, adjacent the second intermediate and bottom rollers 110, 118, may be recessed to receive a second intermediate and bottom rollers 110, 118, as these rollers 110, 118, are moved from their fully engaged position to their maximum position at the toggle point of the second bell crank arm 150 and back again to their full engaged position, so that the second intermediate and bottom rollers 110, 118, engage with the intermediate and bottom roller members 88, 90, when the operating handle 132 is disposed in both its intermediate and fully engaged positions. This assures that the portion of the attenuator wire 72 adjacent the intermediate and bottom roller members 88, 90 cannot become disengaged from its associated rollers 110, 118 during stroking of the seat bucket 12 by slipping between the adjacent ends of the intermediate roller member 88 and the second intermediate roller 110, or the bottom roller member 90 and the second bottom roller 118.

ATTENUATOR OPERATION

FIG. 8 shows typical minimum, intermediae and maximum engagement performance curves of acceleration force, in G units and the seat stroke, in inches, versus the weight of the seat occupant, including all clothing and/or protective equipment worn by the occupant, for the energy attenuator assembly 44 of the seat assembly 10 when the seat assembly 10 is subjected to a 48 G peak pulse of 0.054 seconds duration. Curve A corresponds to the minimum engagement setting of the attenuator assembly 44, in which the attenuator wire 70 is sized to initiate stroking of the seat bucket 12 when a downward acting force of approximately 3500 lbs. is applied to the seat bucket 12. Curve B corresponds to the intermediate engagement setting of the energy attenuator assembly 44, in which energy attenuator wire 72 is sized so that when the wires 70 and 72 are engaged, the seat bucket 12 will begin to stroke when the force acting downward upon it equals approximately 4100 lbs. Curve C corresponds to the fully engaged setting of the energy attenuator assembly 44, in which the attenuator wire 68 is sized so that when all of the attenuator wires 68, 70, 72, are engaged, a downward acting force of approximately 5000 lbs. must be applied to the seat bucket 12 to initiate stroking.

When the energy attenuator assembly 44 is set at its minimum engaged position, the acceleration force acting on the seat occupant will not exceed 22 G, and the seat stroke will not exceed 7 inches, so long as the vertically effective weight of the seat bucket 12 and the fully clothed seat occupant falls within the range of 157 to 191 lbs. When the energy attenuator assembly 44 is set at its intermediate engagement position, the maximum acceleration force exerted on a seat occupant will be limited to 22 G and the maximum stroke of the seat bucket 12 will be limited to 7 inches so long as the vertically effective weight of the seat bucket 12 and the occupant therein falls with the range of 187 to 228 lbs. Similarly, when the energy attenuator assembly 44 is set in its maximum engagement position, the maximum acceleration force on the seat occupant will be limited to 22 G and the maximum stroke of the seat bucket 12 will be limited to 7 inches so long as the combined vertically effective weight of the seat bucket 12 and the occupant therein falls within the range of 227 to 277 lbs. Thus, it is possible with this energy attenuator assembly 44 to limit the acceleration forces acting on the seat occupant to a maximum of 22 G and at the same time to limit the seat stroke to 7 inches for a wide range of occupants, in which the heaviest fully clothed and equipped seat occupant weighs approximately 120 lbs. more than the lightest fully clothed and equipped seat occupant. By increasing the maximum allowable seat stroke to a higher value, say 8 inches, the overlap between the three settings of the energy atenuator assembly 44 is increased. By increasing the maximum allowable seat stroke and also decreasing the size of the energy attenuator wires 68, 70, 72, the maximum acceleration force on the seat occupant can be reduced.

Many variations and adaptations may be made to the embodiment of the invention discussed above, within the intended scope of the invention. For example, FIGS. 9 and 10 illustrate an energy attenuator assembly 44' similar to the energy attenuator assembly 44 described above and having its elements numbered the same as corresponding elements of the energy attenuator assembly 44. The trolley mounting plate 76' is similar to the mounting plate 76 described above except that it includes two additional vertical plates 166, 168, extending between the two portions of the attenuator wires 68 and 72, respectively. The attenuator adjustment mechanism 126' is similar to the above described attenuator adjustment mechanism 126, except that it includes a vertically extending operating shaft 130' having a bell crank 144' affixed to its lower end and extending to a spring loaded manual operating handle assembly 170 which is functionally similar to the manual operating lever assembly 128 described above except having three intermediate settings between a minimum and a maximum engagement setting, rather than only one. The bell crank 144' is connected to operate the first and second levers 154, 158, by first and second connecting links 148', 152' similar to first and second connecting links 148, 152 described above.

When the operating shaft 130' is rotated in a clockwise direction from its minimum engagement setting shown in FIG. 10 to a first intermediate setting, the second intermediate bottom rod assemblies 98, 102 are engaged with a portion of the attenuation wires 72 disposed between the vertical plates 84 and 168. As the operating handle is further rotated in a clockwise direction to a second intermediate setting, the second intermediate and bottom rod assemblies are moved axially inward to engage the other portion of the attenuation wire 72 disposed between the vertical plates 82 and 68. When the operating shaft 130' is rotated clockwise from its second intermediate setting, the second intermediate and bottom rod assemblies 98, 102, remain engaged with both portions of the wire 72, and the first intermediate and bottom assemblies 96, 100 are moved axially inward and engage the portion of the attenuation wire 68 disposed between the vertical plates 78 and 166. Finally, as the operating shaft 130' is rotated clockwise to its maximum engagement position, a first intermediate and bottom rod assemblies 96, 100 are further moved axially inward to engage the other portion of the wire 68 disposed between the vertical plates 168 and 80. The additional intermediate settings of the energy attenuator assembly 44' either allow the maximum stroking distance to be further reduced, or allow a wider range in the weight of the seat occupant or allow the size of the wires 68, 70, 72 to be reduced to lower the maximum acceleration force for the seat occupant.

In another variation of the invention, the first and second intermediate rod assemblies 96, 98 can be moved in a forward direction towards the seat bucket 12, and the first and second bottom rod assemblies 100, 102, can be moved in opposite backward direction towards the support structure 18, rather than moving these rod assemblies 96, 98, 100, 102, along their axes. However, this is not a preferred embodiment of the invention in that the seat bucket 12 must be spaced much further from the support structure 18 than it is in the above described preferred embodiment.

Also, since energy attenuators of the wire bending type require only two rollers engaging the attenuation wires, in yet another variation of the invention the first and second bottom rod assemblies 100, 102, can be omitted. However, this is disadvantageous in that, for the same size attenuation wires, the force at which stroking of the seat is initiated is reduced to one-half or less than the force of a three roller wire bending trolley assemblies, as described above.

In another variation of the invention, the support structure 18 is integrally affixed to a vertical bulkhead of the aircraft to allow the seat bucket 12 to stroke downward along a vertical path in the event of a crash.

There are many other variations or modifications of this invention in addition to those discussed above which will be apparent to one skilled in the art, it is intended that the scope of this invention be limited only by the appended claims.

What is claimed is:

1. In a crash survivable seat arrangement for a vehicle which includes two elements, namely a seat assembly and a support structure, occupant restraint means for securing a vehicle occupant to the seat assembly, seat assembly connecting means for connecting the seat assembly to the support structure to allow translation of the seat assembly relative to the support structure along a predetermined path of travel, and energy attenuating means for controlling the translation of the seat assembly relative to the support structure in a given direction along the path of travel during a crash, the improvement wherein the energy attenuating means comprises:

a plurality of spaced apart, parallel arranged, wires having opposite ends affixed to one element of the two elements and extending substantially parallel to said path of travel;

wire bending means, carried by the other element of the two elements and engaged with at least one wire of said plurality of wires, for bending said at least one wire during translation of the seat assembly in the given direction relative to the support structure, said wire bending means preventing translation of the seat assembly until a predetermined force acts in the given direction on the seat assembly; and engaging means, connected between the other element and the wire bending means, for progressively engaging or disengaging the wire bending means with the plurality of wires, said engaging means having a maximum engagement setting at which the wire bending means is engaged with all wires of the plurality of wires and a minimum engagement setting at which the wire bending means is engaged with at least one wire of said plurality of wires.

2. A vehicle seat arrangement, as described in claim 1, wherein the seat assembly includes:

a seat for receiving a vehicle occupant;
a frame connected to the energy attenuating means;
seat connecting means for connecting the seat to the frame to allow translation of the seat relative to the frame along a substantially vertical path of travel; and seat locking means for locking the seat to the frame at selected positions along the substantially vertical path of travel.

3. A vehicle seat arrangement, as described in claim 1, which further comprises:
support structure connecting means for connecting the support structure to the vehicle to allow translation of the support structure relative to the vehicle along a substantial horizontal path of travel; and
support structure locking means for locking the support structure to the vehicle at selected positions along the substantially horizontal path of travel.

4. A vehicle seat arrangement, as described in claim 1, wherein the wire bending means includes at least one disengagable wire bending assembly which comprises:
first and second rods having parallel axes extending orthogonally of the path of travel, the second rod being spaced from the first rod in said given direction along the path of travel, the two rods being disposed intermediate the opposite ends of at least one wire of the plurality of wire so that the at least one wire is bent about one side of the first rod and about an opposite side of the second rod, the second rod being operatively connected to the engaging means for movement into and out of engagement with the at least one wire.

5. A vehicle seat arrangement, as described in claim 4, wherein the at least one disengageable wire bending assembly further comprises:
a third rod having an axis parallel to the axes of the first and second rods, the third rod being spaced from the second rod along the path of travel in the given direction so that the at least one wire is bent about the one side of the first rod, about the opposite side of the second rod, and about the same one side of the third rod, one side of the at least one wire engaging the first and third rods, and an opposite side of the at least one wire engaging the second rod; and
wherein the second and third rods are slidably carried by said other element for translation relative to the other element along their respective rod axes, and are connected to the engaging means for axial movement between first positions at which they are engaged with the at least one wire and last positions at which they are disengaged with the at least one wire.

6. A vehicle seat arrangement, as described in claim 5, wherein:
the at least one wire with which the second and third rods of the at least one disengageable wire bending assembly are engaged or disengaged by the engaging means comprises at least two wires of the plurality of wires, which are sequentially engaged or disengaged as the second and third rods are axially moved between their first and last positions, the second and third rods having at least one intermediate position corresponding to at least one intermediate setting of the engaging means at which it is engaged with at least one wire and is disengaged from at least another wire of the at least two wires.

7. A vehicle seat arrangement, as described in claim 5, wherein the second and third rods of the at least one disengagable wire bending assembly each comprises:
a first axially-extending member which is connected to the engaging means; and
a second roller member, rotatably carried by the first member for rotation about the rod axis, which is engaged with the at least one wire when the rod is disposed in its first position.

8. A vehicle seat arrangement, as described in claim 7, wherein the wire bending means further comprises a non-disengagable wire bending assembly which comprises:
first, second and third rods having parallel axes extending orthogonally of the path of travel of the seat assembly, the three rods being disposed intermediate the opposite ends of at least another wire of the plurality of wires so that the at least another wire is bent about one side of the first rod, about an opposite side of the second rod intermediate the first and third rods, and about the same one side of the third rod, one side of the at least another wire engaging the first and third rods, and an opposite of the at least another wire engaging the second rod;
wherein the non-disengagable wire bending assembly determines the minimum engagement of the wire bending means.

9. A vehicle seat arrangement, as described in claim 8, wherein the first, second, and third rods of the non-disengagable wire bending assembly carried by said other element comprise first, second and third roller members which are rotatably carried by the other element for rotation about the first, second, and third rod axes, respectively, the at least another wire being bent about and engaging the three roller members.

10. A vehicle seat arrangement, as described in claim 8, wherein all first rods of the disengagable and non-disengagable wire bending assemblies have a common axis and are integrally joined to form a common roller member rotatably carried by the other element for rotation about said common axis.

11. A vehicle seat arrangement, as described in claim 8, wherein the at least one disengagable wire bending assembly comprises:
at least a first disengageable wire bending assembly disposed on one side of the non-disengagable wire bending assembly; and
at least a second disengageable wire bending assembly disposed on an opposite side of the non-disengageable wire bending assembly.

12. A vehicle seat arrangement, as described in claim 8, wherein the first, second, and third rods of all wire bending assemblies have first, second and third common rod axes, respectively.

* * * * *